(12) United States Patent
Burkhardt et al.

(10) Patent No.: US 11,460,349 B2
(45) Date of Patent: Oct. 4, 2022

(54) SENSOR PROBE FOR MEASURING A FOOD PREPARATION PARAMETER

(71) Applicant: ELECTROLUX APPLIANCES AKTIEBOLAG, Stockholm (SE)

(72) Inventors: Jennifer Burkhardt, Rothenburg ob der Tauber (DE); Michael Herzog, Rothenburg ob der Tauber (DE); Scott King, Stockholm (SE); Bianca Puchinger, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 341 days.

(21) Appl. No.: 16/626,698

(22) PCT Filed: Jul. 1, 2018

(86) PCT No.: PCT/EP2018/067724
§ 371 (c)(1),
(2) Date: Dec. 26, 2019

(87) PCT Pub. No.: WO2019/015941
PCT Pub. Date: Jan. 24, 2019

(65) Prior Publication Data
US 2020/0225095 A1    Jul. 16, 2020

(30) Foreign Application Priority Data

Jul. 21, 2017 (EP) ..................................... 17182630

(51) Int. Cl.
*G01K 1/14* (2021.01)

(52) U.S. Cl.
CPC ........... *G01K 1/14* (2013.01); *G01K 2207/06* (2013.01)

(58) Field of Classification Search
USPC ......................................... 374/208, 155, 163
See application file for complete search history.

(56) References Cited

U.S. PATENT DOCUMENTS

| 2,902,860 | A |   | 9/1959 | Glass |
| 2,906,124 | A |   | 9/1959 | Chaney |
| 5,802,960 | A | * | 9/1998 | Graj ........................ A47J 45/06 99/422 |

(Continued)

FOREIGN PATENT DOCUMENTS

| CN | 2829598 |   | 10/2006 |
| CN | 202051505 U | * | 11/2011 |

(Continued)

OTHER PUBLICATIONS

Chinese Office action for application No. CN 201880046981.X, dated Sep. 17, 2020, 7 pages.

(Continued)

*Primary Examiner* — Mirellys Jagan
(74) *Attorney, Agent, or Firm* — Pearne & Gordon LLP

(57) ABSTRACT

A sensor probe (10) for measuring a food preparation parameter, comprises an elongate handle portion (12) for manipulating the sensor probe, an elongate sensor portion (14), and a stepped connecting portion (16) connecting the handle portion (12) and the sensor portion (14), such that the longitudinal axis of the handle portion is offset with respect to the longitudinal axis of the sensor portion.

18 Claims, 2 Drawing Sheets

(56) References Cited

U.S. PATENT DOCUMENTS

| | | | |
|---|---|---|---|
| 2015/0059469 A1 | 3/2015 | Batti et al. | |
| 2016/0371956 A1* | 12/2016 | Henry | G01J 5/10 |
| 2017/0099990 A1 | 4/2017 | Magnouloux et al. | |
| 2017/0138797 A1 | 5/2017 | Brown et al. | |
| 2017/0231415 A1* | 8/2017 | Cheng | G01K 13/00 |
| | | | 374/141 |
| 2021/0172805 A1* | 6/2021 | Cadima | G01K 1/146 |

FOREIGN PATENT DOCUMENTS

| | | |
|---|---|---|
| CN | 202676310 | 1/2013 |
| CN | 205192656 | 4/2016 |
| CN | 106937834 | 7/2017 |
| DE | 102011083343 A1 | 3/2013 |
| EP | 1624724 B1 | 5/2010 |

OTHER PUBLICATIONS

International Search Report and Written Opinion in PCT/EP2018/067724 dated Sep. 27, 2018, 10 pages.

\* cited by examiner

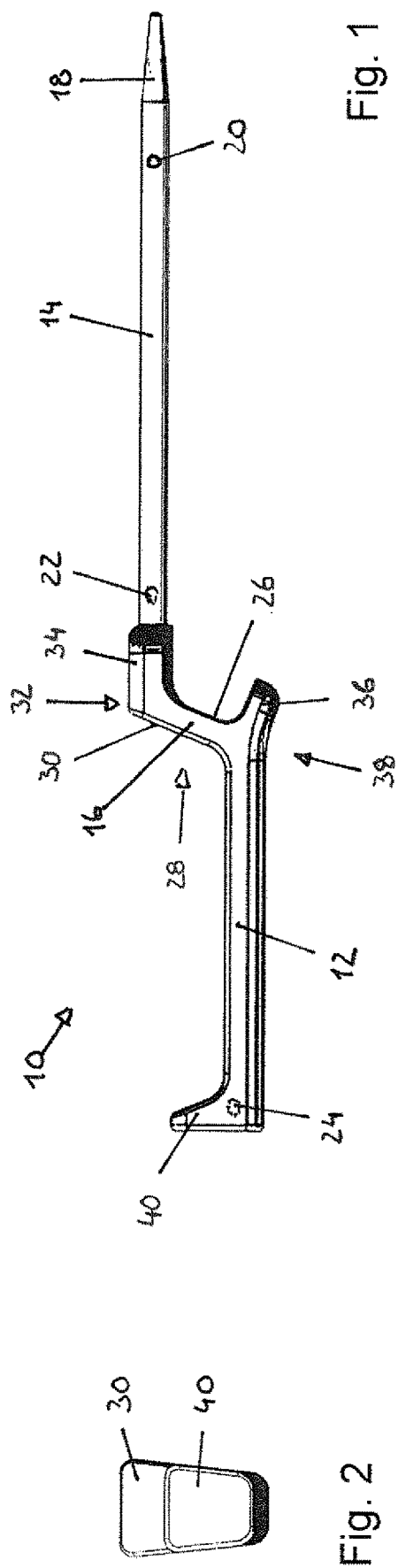
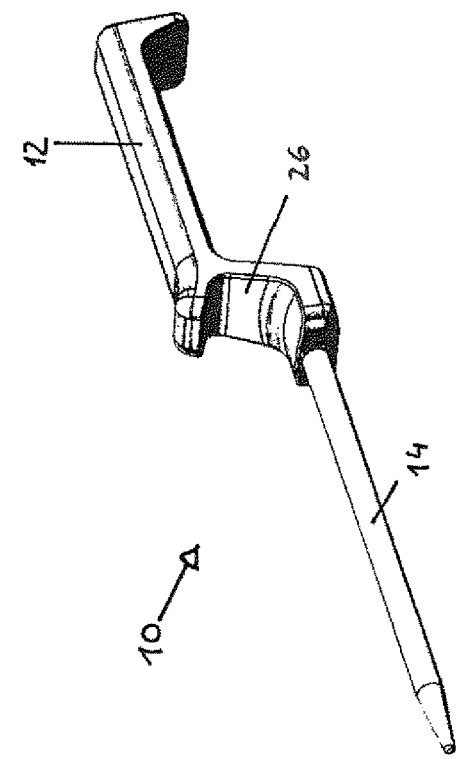

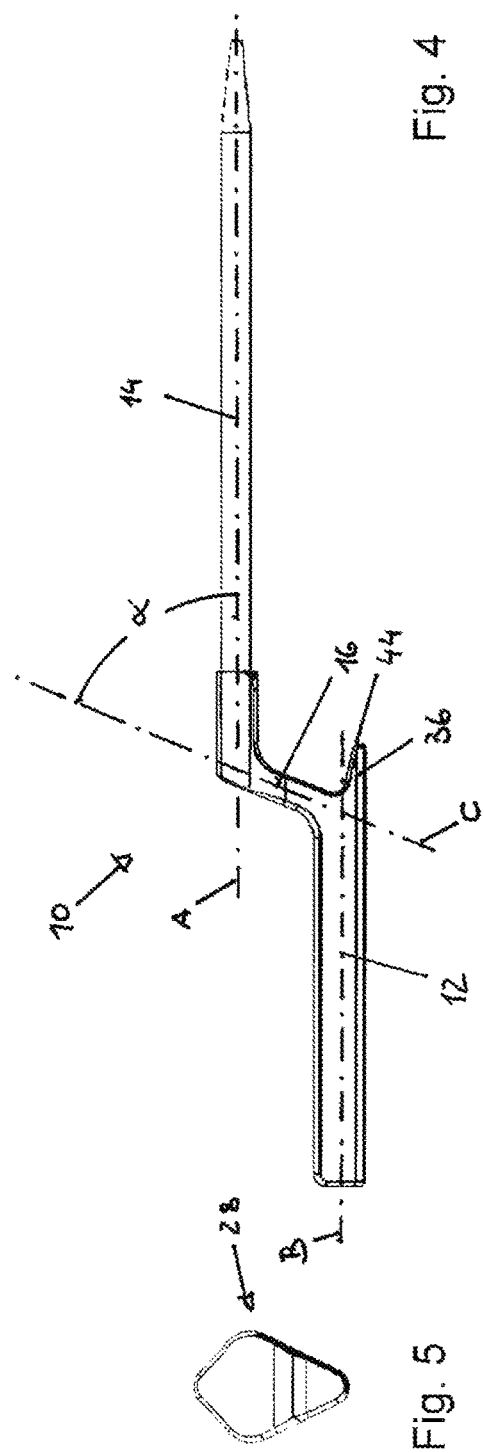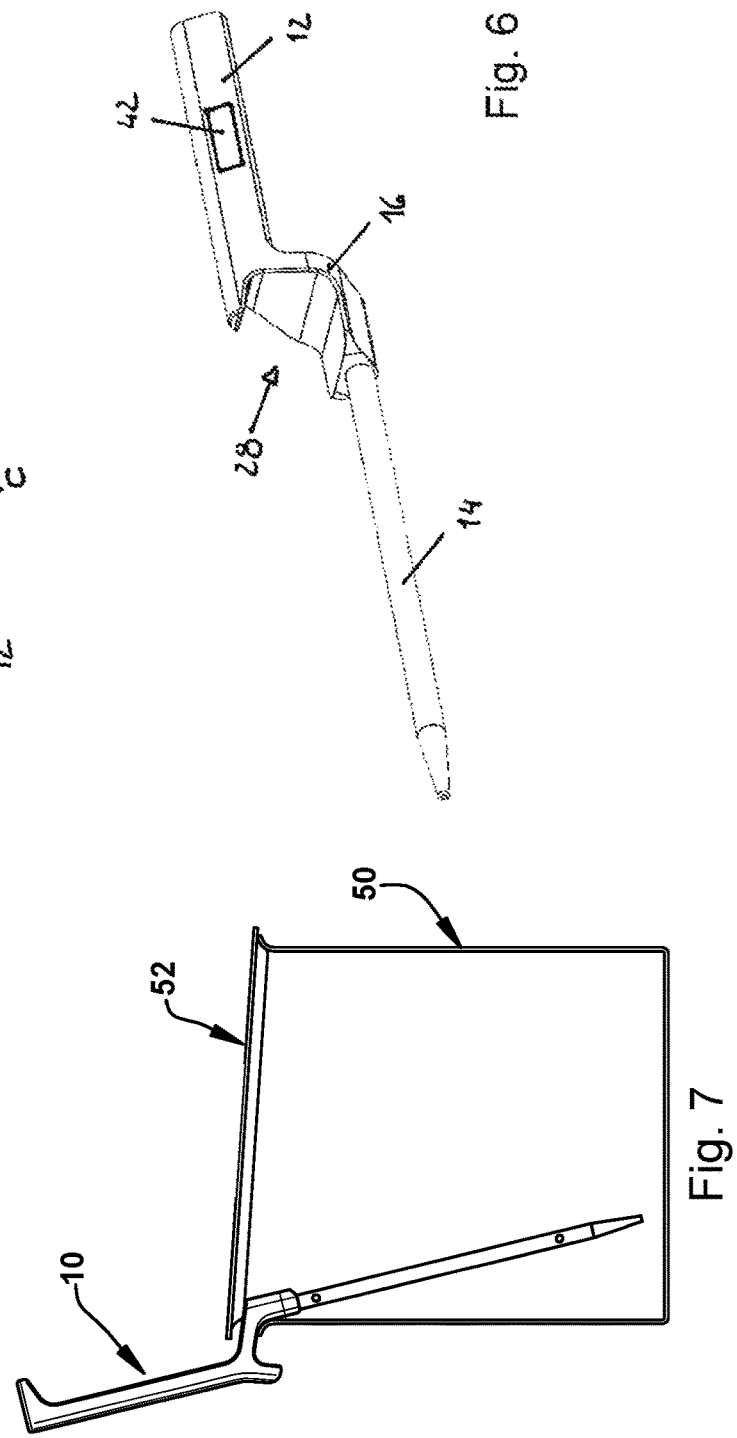

SENSOR PROBE FOR MEASURING A FOOD PREPARATION PARAMETER

FIELD OF THE INVENTION

The present invention relates to a sensor probe for measuring a food preparation parameter.

BACKGROUND

Sensor probes are used in the preparation of food products to determine various parameters that are relevant to the food preparation process. One example of such sensor probes are thermometers for measuring the temperature of the contents of a cooking utensil, such as the temperature of a liquid within a cooking pot or the core temperature of a piece of meat or poultry during the preparation process.

While such devices often are designed as stand-alone devices having an analog or digital display to indicate to the user the measured parameter, in modern cooking appliances sensor probes often are used to assist the cooking process by providing sensor data to a controller of the cooking appliance. In order to provide sensor data to the controller of the cooking appliance, the sensor probe either is connected to the controller by means of a wire connection, or is provided with a transmitter for wireless transmission of sensor data to a receiver connected to the controller.

In either case the sensor probe typically comprises a sensor portion, often designed as an elongate tube having a pointed tip, wherein within the tube there are provided one or more sensors, and a handle portion comprising a handle for manipulating the sensor probe. Depending on whether the sensor probe is a stand-alone device or a device that transmits data to a remote controller, the handle portion may comprise a display or may house signal electronics for transmitting sensor data either by wire or by wireless transmission to a remote controller.

Such a device is shown in EP 1 624 724 B1 which is concerned with a probe for detecting a parameter, such as temperature, during a cooking procedure. The probe comprises a grip portion one end of which is connected to an elongate metallic tube having a pointed tip, wherein the elongate metallic tube comprises a thermoelectric sensor. At the other end of the grip portion there is provided an antenna for wireless transmission of sensor data.

A problem commonly occurring in all such devices is the placement of the sensor probe. Thus, particularly when the sensor probe is used for measuring the temperature of liquid within a cooking pot, such as to control the temperature supplied to the cooking pot in a manner that avoids the liquid from boiling over, known devices often fail to provide for a stable placement of the sensor probe at the cooking pot.

A further problem encountered with many known sensor probes is that when the sensor probe is placed at a cooking utensil, a portion of the sensor probe has to project outwardly from the cooking utensil, which thus prevents that the cooking utensil can be properly closed during the cooking process. For example when measuring the core temperature of a piece of meat that is to be prepared in a cooking vessel, such as pot, sauce pan or casserole, with a sensor probe having a handle portion and a sensor portion, the sensor probe either has to be placed within the closed vessel, which is disadvantageous because then not only can the sensor probe not be properly fixed and thus may move in an uncontrolled manner within the cooking utensil, but also because the handle portion is to be located within the cooking vessel where it will be exposed to the high temperature, high humidity environment of the cooking vessel. In the alternative, the sensor probe has to be placed such that only the sensor portion is located within the vessel but the handle portion is located outside the vessel, which however necessitates that the cooking vessel cannot be properly closed during the cooking process. Due to the sensor projecting from out of the pot, there will be a gap between the lid and the rim of the pot, which is disadvantageous for several reasons, such as thermal inefficiency as energy in form of water vapor is lost through the gap.

SUMMARY OF THE INVENTION

It is an object of the present invention to provide a sensor probe for measuring a food preparation parameter which alleviates the above problems. In particular, the present invention aims at providing a sensor probe for measuring a food preparation parameter, which allows a more stable fixation of the sensor probe at a cooking utensil and which further facilitates use of the sensor probe during a cooking process, wherein adverse effects on the cooking process are to be minimized.

In accordance with the present invention the above object is solved by a sensor probe for measuring a food preparation parameter, which comprises an elongate handle portion for manipulating the sensor probe, an elongate sensor portion, and a stepped connecting portion connecting the handle portion and the sensor portion such that the longitudinal axis of the handle portion is offset with respect to the longitudinal axis of the sensor portion. By providing for an offset between the handle portion and the sensor portion it is made possible to place the sensor probe at a cooking vessel in such a manner that the sensor probe is held by the stepped connecting portion at the rim of the cooking vessel, so that the sensor portion projects into the cooking vessel, but the handle portion is located outside the cooking vessel, wherein due to the stepped configuration of the connecting portion it further is possible to place a lid on top of the cooking vessel, so as to close the interior of the cooking vessel with minimum interference by the sensor probe.

By making it possible to close the cooking vessel during use of the sensor probe while a cooking process is conducted, the handle portion can be protected from fumes and vapors generated during the cooking process, which not only has positive effects on the lifetime of the device, but further by avoiding heating and soiling of the handle portion improves the ease of use of the device.

Furthermore, the stepped configuration of the connecting portion improves the stability of the placement of the sensor probe at the cooking vessel, because the sensor probe can be located at the cooking vessel such that the stepped connecting portion rests on the rim of the cooking vessel, wherein additional stability can be provided by placing a lid on the cooking vessel, such that it rests on the stepped connecting portion which in this manner is clamped between the rim of the cooking vessel and the lid.

The connecting portion can comprise a first end connected to the handle portion, a second end connected to the sensor portion, and a substantially flat intermediate portion connecting the first and the second end. By designing the intermediate portion as a substantially flat member, placing a lid on the cooking vessel during use of the sensor probe is facilitated, wherein the smaller the height of the intermediate portion, the smaller is the gap between the lid and the rim of the cooking vessel. Placement of the sensor probe at a rim of a cooking vessel can be further stabilized by providing for a connecting portion having an extended width in the direction transverse to the direction of the step that is in the direction where the sensor probe during use rests with the connecting portion on the rim of a cooking vessel.

In preferred embodiments, the connecting portion has an upper side facing towards the handle portion and a lower side facing towards the sensor portion, wherein the connecting portion at the first end of the connecting portion, that is, at the end connected to the handle portion, comprises a protrusion, for example a rim, that extends from the lower side of the connecting portion.

Given that in these embodiments the sensor probe at both ends of the connecting portion comprises an element that extends in a downward direction, i.e. at one end the sensor portion and at the other end the protrusion, the sensor probe can be hooked onto the rim of a cooking vessel wherein, wherein the protrusion prevents the connecting portion from inadvertently slipping off from the rim of the cooking vessel.

In such latter embodiments, the fixation of the sensor probe at a cooking vessel can be further improved and stabilized by providing the protrusion with magnetic properties, so that when using the sensor probe with a cooking vessel having ferromagnetic properties, such as a cast iron pot, the sensor will be held by the properties of the protrusion at the rim of the cooking pot.

Preferably the dimensions and weights of the handle portion, the sensor portion, and the connecting portion are selected such that the center of gravity of the sensor probe is located in the connecting portion. In this manner the sensor probe when located on the rim of a cooking utensil will be balanced, so as to avoid tilting of the sensor probe into or out of the cooking utensil even without the sensor probe being held either by clamping the same between the rim of a cooking utensil and a lid or by additional fixation means such as magnets and the like.

Thus, whereas when using the sensor probe as a food thermometer, the sensor probe can be held in position not only by the connecting portion that may rest on the rim of a cooking vessel, but also will be held by the food piece itself, the core temperature of which is to be measured, in preferred embodiments the sensor probe is designed such that the weight of the sensor portion corresponds to the weight of the handle portion, which allows stable placing of the sensor probe on the rim of a cooking vessel independent from its interference with a food piece. Such a design allows a tilt-free use of the sensor probe for example when designed as a temperature probe that is used to measure the temperature of air or liquid within a cooking pot, or in embodiments in which the sensor portion is designed for free floating placement within a cooking environment, for example in embodiments in which the sensor portion is provided with a humidity sensor.

When the sensor portion comprises an elongate element that extends along a main axis, for example when the sensor portion is designed as a meat thermometer and thus comprises an elongate tubular member having a pointed tip, the stepped connecting portion can be defined as a portion that extends at an angle to the main axis of the sensor portion, which angle preferably is within a range of from 45° to 90°. Preferably, the angle between the main axis and the stepped connecting portion is at least 45° C., more preferably at least 55°, and still more preferably at least 65°. That is, while a smaller angle may be preferred for use of the sensor probe in a shallow cooking utensil, the angle should not be chosen too small, so as to avoid that the sensor probe, when set of the rim of a cooking pot, does not reach down for a sufficient extent to measure the temperature of food items being processed within the cooking pot. Thus, while for practical reasons the angle between the main axis and the stepped connecting portion should not be less than 30°, the maximum of such angle should be limited to 90° so as to avoid that the sensor probe, when set of the rim of a cooking pot, leans towards the side wall of the cooking pot. Accordingly, in preferred embodiments the angle between the main axis and the stepped connecting portion is at maximum 85° C., still more preferably is at maximum 75°. Most preferably the angle between the main axis and the stepped connecting portion is about 70°. In embodiments the sensor probe is designed such that both the sensor portion and the handle portion comprise elongate elements extending along a main axis, wherein the main axis of the handle portion extends substantially parallel to the main axis of the sensor portion. In such embodiments an overall elongate configuration is achieved which is advantageous particularly when the sensor probe is designed as a meat thermometer, wherein the handle portion thus has the same orientation as the sensor portion which provides for ease of use when pushing the sensor portion into a food piece, such as a piece of meat.

Depending on the overall design of the sensor probe, the handle portion and the sensor portion can be arranged at an angle to each other or one of the two portions may have a shape different from an elongate shape, for example by providing a handle portion of rounded shape, such as a knob. Of course, in any such embodiments care has to be taken, that there is provided for a stepped connecting portion so as to achieve the advantages of the present invention described above.

The sensor probe preferably has an overall length of between 15 and 30 cm. Thus, while a longer overall length allows using the sensor probe also with larger cooking utensils, a length of more than 30 cm in most cases will not provide for any further advantage, but to the contrary may be considered unpractical.

Similarly, making the sensor probe smaller than 15 cm will be considered unpractical by most users, particularly when the sensor probe shall be used for measuring the core temperature of a piece of meat, into which the sensor probe is to be inserted. Thus, while the overall length of the sensor probe preferably is limited to a maximum of 25 cm, further preferred is limited to 22 cm, and even further preferred is limited to 20 cm, in practical testing a minimum length of 17 cm, more preferred of at least 18.5 cm and most preferred of about 19.5 cm was considered to provide for the best comfort of use.

To allow for a comfortable handling of the device, the handle portion should have a length of from 6 to 10 cm, preferably of from 6.5 to 9 cm, more preferred of from 7 to 8 cm, and most preferred of about 7.5 cm. In dependency of the overall length of the sensor probe, the sensor portion thus preferably has a length of from 10 cm to 20 cm. While the length of the handle portion will be chosen mainly for reasons of ergonomics, the length of the sensor probe can be chosen in dependency of the overall length of the sensor probe and on how far the sensor probe is to project into a cooking utensil. Thus, while the length of the sensor portion can be more or less freely chosen, in the most preferred embodiment, in which the sensor probe has an overall length of about 19.5 cm, wherein the handle portion has a length of about 7.5 cm, the sensor portion thus will have a length of about 12.0 cm. Note that in the above values the extension of the stepped connecting portion has been ignored.

That is, while the stepped connecting portion which provides for a connection between the handle portion and the sensor portion, such as by molding a plastic connecting portion onto a metallic sensor portion, wherein such plastic connecting portion can be integrally joined with a handle portion that is formed of the same plastic material as the connecting portion, the above lengths are indicated as measured from an imaginary point located within the stepped connecting portion, which point may be located at a distance of about 1 to 2 cm, most preferably of about 1.5 cm from the end of the stepped connecting portion facing towards the sensor portion.

Considering that as noted above the center of gravity of the sensor probe preferably is located in the connecting portion, it will be readily understood that the dimensions of the individual parts of the sensor probe, particularly the lengths and the cross-sectional areas of the handle portion, of the sensor portion and of the stepped connecting portion, will be selected by taking into consideration the weights of the materials used. That is, in a preferred embodiment, in which the sensor portion is made of a hollow metal tube, and in which the handle portion is made of molded plastic, a ratio of the length of the sensor portion to the length of the handle portion of about 1.4 to 2, more preferred of about 1.5 to 1, 7, and most preferred of about 1.6 has proven to provide for a comfortable and practical design.

While as explained above, the sensor probe is designed to be set with the stepped connecting portion onto a rim of a cooking utensil, the length of the stepped connection portion, when measured in the direction along the step that connects the handle portion and the sensor portion, is selected such that it allows stable positioning of the sensor probe at the rim of a cooking utensil, irrespective of the wall thickness of the cooking utensil along such rim. That is, while the length of the stepped connection portion should not be made too small, so as to allow using the sensor probe also with cooking utensils having a large wall thickness, such as pottery ware, the length of the stepped connection portion should be limited to a maximum, so as to facilitate placing the sensor probe in a balanced state onto the rim of the cooking utensil. Thus, while the stepped connection portion preferably has a length of about 8 to 25 mm, more preferred of 10 to 20 mm or of 12 to 18 mm, the length of the stepped connection portion most preferred is about 15 mm.

Whereas the sensor portion typically will be made of metal, such as stainless steel, the handle portion or parts thereof can be made of heat resistant plastic material, such as silicone or nylon. Using heat resistant plastic material for the handle portion or parts thereof offers a wide variety of design possibilities not only because the handle portion, or parts thereof, can be formed in a simple manner in various shapes and with different textures for example by a molding process, but also because a wide variety of materials with different material characteristics can be used, which thus offer a broad range in terms of color, hardness, temperature resistance, chemical resistance and the like.

The placement of the sensor probe at a cooking utensil, such as a rim of a pot, can be further improved by providing the intermediate portion of the connecting portion with a slip-resistant surface at its upper side, its lower side, or both the upper and the lower side. Thus, whereas for example the main body and particularly the ends of the connecting portion which provide for a connection to the handle portion and the sensor portion can be formed of a relatively hard material, so as to provide stiffness and rigidity for the sensor probe, the surfaces of the intermediate portion of the connecting portion that may come into contact with a cooking vessel or a lid thereof can be provided with a softer slip-resistant surface, such as a coating of soft heat resistant silicone.

Particularly when the sensor probe is designed for use as a food thermometer, such as a poultry or meat thermometer, the handle portion at its free end facing away from the connecting portion can comprise a gripping portion having an enlarged cross-section, which facilities both insertion and removal of the sensor portion of the probe into and out of a food piece.

In embodiments of the sensor probe where the probe is designed for use as a food thermometer, such as a poultry or meat thermometer, the sensor portion advantageously comprises an elongate member having a pointed tip, so as to facilitate insertion of the sensor portion into a food piece.

The sensor probe can comprise one or more sensors selected from the group consisting of temperature sensors, humidity sensors, impedance sensors, density sensors, pressure sensors, or any other type of sensor that may be used of advantage in a cooking environment. Furthermore, the sensor probe can comprise different types of sensors, i.e. combinations of the afore-mentioned sensor types.

While the sensor probe can comprise a wire connection, preferably a heat resistant wire connection, for transmission of sensor data to processing means, such as a controller which controls the heat and/or air supply to the cooking zone of a kitchen appliance, in preferred embodiments the sensor probe comprises a transmitter for wireless transmission of sensor data. The wireless data transmission may use any feasible wireless transmission technique, such as radio transmission, Bluetooth, and the like, but most preferably employs SAW technology, i.e. a transmitting transducer which transmits a signal by generating Surface Acoustic Waves that are detected by a corresponding receiving transducer that may be provided for example at a cooking hob with which the sensor probe is to be used.

In embodiments in which the sensor probe is configured for wireless data transmission, the power supply and the signal electronics preferably is housed within the handle portion.

BRIEF DESCRIPTION OF THE DRAWINGS

Preferred embodiments of the invention are described below by reference to the drawings in which:

FIG. 1 is a side view of a sensor probe in accordance with a first embodiment of the present invention;

FIG. 2 is a top view of the sensor probe shown in FIG. 1;

FIG. 3 is a perspective view of the sensor probe shown in FIG. 1;

FIG. 4 is a side view of a sensor probe in accordance with a second embodiment of the present invention;

FIG. 5 is a top view of the sensor probe shown in FIG. 4; and

FIG. 6 is a perspective view of the sensor probe shown in FIG. 4.

FIG. 7 is a schematic view of the sensor probe shown in FIG. 1 in a cooking vessel with a lid.

BACKGROUND OF INVENTION

Detailed Description

A first embodiment of a sensor probe in accordance with the present invention is illustrated in FIGS. 1 to 3.

Sensor probe 10 shown in FIGS. 1 to 3 comprises a handle portion 12 and a sensor portion 14 which are connected to each other by means of a stepped connecting portion 16. In the shown embodiments, the sensor portion 14 is configured as a temperature probe which may be used to measure the core temperature of a food piece, such as a roast. To facilitate insertion of the sensor portion 14 into the food piece, sensor portion 14 is provided with a pointed tip 18. Sensor portion 14 can be formed of a hollow metal tube, such as a stainless steel tube having a diameter of about 4 to 4.5 mm and most preferably of 4.2 mm. Within sensor portion 14 and/or its tip 18, there can be provided one or more sensors for measuring one or more parameters that are of interest for a cooking process, such as temperature, humidity, impedance, density, pressure and the like.

In the embodiment shown in FIGS. 1 to 3, in which as noted above the sensor probe is configured as a temperature probe, a first temperature sensor 20 for measuring the temperature of an article subject to the cooking process, such as a liquid within a cooking pot or the core temperature of a piece of meat to be roasted is provided within the hollow metal tube of sensor portion 14 at a distance of about 2 cm from tip 18. In the embodiment depicted in FIG. 1, a second temperature sensor 22 is provided within the hollow metal tube of sensor portion 14, so as to be located closer to the connecting portion 16. Further sensors may be provided in the sensor portion 14 or the handle portion 12. For example, a third temperature sensor 24 may be provided at handle portion 12, so that when using sensor probe 10 to measure the temperature of food that is prepared in a cooking vessel, such as a piece of meat that is heated within a casserole, the third temperature sensor 24 may be used to measure the ambient temperature outside the casserole.

In such exemplary use of the sensor probe 10 illustrated in FIGS. 1 to 3, when heating the said casserole within an oven, the first temperature sensor 20 will provide for a reading of the core temperature of the piece of meat that is roasted within the casserole, the second temperature sensor 22 will provide for a reading of the air temperature within the casserole, and the third temperature sensor 24 provide for a reading of the temperature within the oven cavity.

In a particularly preferred embodiment, sensor probe 10 is equipped with only the temperature sensor 20, i.e. additional sensors 22 and 24 are omitted, so that the sensor probe provides a single temperature reading which then can be continuously transmitted via an SAW transmitter, such as a piezoelectric transducer that may be located within handle portion 12, to a remote receiver, such as a further piezoelectric transducer which transmits the temperature signal to a display or to a control unit so as provide for a temperature reading or an automatic control of the energy supply to the cooking utensil. In the embodiment shown in FIGS. 1 to 3, sensor probe 10 is designed as an elongate element in which the handle portion 12 extends substantially parallel to the sensor portion 14, but wherein the axes of handle portion 12 and sensor portion 14 are offset by virtue of the stepped connecting portion 16. In the embodiment shown in FIGS. 1 to 3, handle portion 12 and connecting portion 16 are designed as an integral piece and are formed of a heat resistant plastic material.

Referring to FIG. 7, when using sensor probe 10 to detect a temperature within a cooking vessel 50, such as the core temperature of a piece of meat which is roasted within a casserole, or the temperature of liquid the is heated within a cooking pot, sensor probe 10 rests with the lower side 26 of an intermediate portion 28 of connecting portion 16 on the rim of the cooking vessel 50, wherein due to the stepped configuration of connecting portion 16 the cooking vessel 50 may be closed by a lid 52 also when the sensor probe 10 is in use, by placing the lid 52 onto the upper side 30 of connecting portion 16.

In the embodiment shown in FIGS. 1 to 3, sensor portion 14 is connected with a first end 32 of connecting portion 16 by a mounting portion 34 of sensor portion 14, which in the embodiment shown is formed integrally with connecting portion 16. To avoid that the sensor probe 10 slips off from the rim of the cooking vessel, there is provided a protrusion 36 at the lower side 26 of connecting portion 16 at a second end 38 of connecting portion 16 where the latter is joined with handle portion 12.

While in the embodiment shown in the drawings, sensor probe 10 is designed for use as a meat thermometer, wherein handle portion 12 extends substantially parallel to the sensor portion 14, the connecting portion 16 extends at an angle with respect to the handle portion 12 and the sensor portion 14. While this also is applicable to the embodiment shown in FIGS. 1 to 3, such configuration is illustrated in FIG. 4, where the longitudinal axis A of sensor portion 14 is shown to extend in parallel to the longitudinal axis B of handle portion 12, wherein axis C of connecting portion 16 extends at an angle $\alpha$ with respect to the longitudinal axis A of sensor portion 14, which angle $\alpha$ is less than 90° and which in the example shown is about 67°. When sensor probe 10 is set on the rim of a cooking vessel such that the intermediate portion 28 of connecting portion 16 extends substantially horizontally, the sensor probe as such will be oriented at an angle to the (usually vertical) walls of the cooking vessel, so that the tip 18 of sensor portion 14 points towards the interior of the cooking vessel.

In the embodiment shown in FIGS. 1 to 3, handle portion 12 at its free end facing away from connecting portion 16, is provided with a gripping portion 40 which facilitates insertion and extraction of the sensor probe 10 into and out of a food piece the core temperature of which is to be detected.

To further stabilize placement of the sensor probe on a rim of a cooking vessel, the lower side 26 of the intermediate portion 30 of connecting portion 16 is provided with a slip-resistant surface, such as a coating of soft heat-resistant silicone.

FIGS. 4 to 6 illustrate a second embodiment of a sensor probe 10 which differs from the embodiment shown in FIGS. 1 to 3 by the shape of the handle portion and the intermediate portion.

Thus, whereas in such second embodiment the handle portion 12 is designed as an elongate member having the same cross-sectional shape over its entire length, wherein protrusion 36 is designed as a partial extension of the shape of handle portion 12, as can be seen in FIGS. 5 and 6 the intermediate portion 28 of connecting portion 16 is designed to have an enlarged cross-section. When placing the sensor probe 10 shown in FIGS. 4 to 6 on the rim of a cooking vessel, the enlarged cross-section of intermediate portion 28 provides for a larger contact area, which provides for further stability in use of the sensor probe. To assist fixation of the sensor probe at a cooking vessel having ferromagnetic properties, such as a cast iron pot, the protrusion 36 is provided with a magnetic layer 44.

Both in the embodiment shown in FIGS. 1 to 3 an in the embodiment shown in FIGS. 4 to 6, handle portion 12 houses circuitry for conditioning the signals obtained from the various sensors, a transmitter for transmitting the conditioned data to an external device, such as a controller of a cooking appliance, and a power source for powering the electrical components of sensor probe 10. While sensor probe 10 thus can be employed to assist an automated cooking procedure, that is controlled, at least in part, in dependency of data obtained from sensor probe 10, sensor probe 10 also can be used as a stand-alone device, which provides a reading of a cooking parameter of interest, such as temperature. To this end sensor probe 10 can be provided with a display 42 (see FIG. 6) that is provided in handle portion 12, or can be designed to transmit data to an external display.

LIST OF REFERENCE SIGNS 10 sensor probe
12 handle portion
14 sensor portion
16 stepped connecting portion
18 tip
20 first temperature sensor
22 second temperature sensor
24 third temperature sensor
26 lower side of 28
28 intermediate portion of 16
30 upper side of 16
32 first end of 16
34 mounting portion
36 protrusion
38 second end of 16
40 gripping portion
42 display
44 magnetic layer

The invention claimed is:

1. A sensor probe for measuring a food preparation parameter, comprising:
    an elongate handle portion for manipulating the sensor probe;
    an elongate sensor portion; and
    a stepped connecting portion connecting the handle portion and the sensor portion such that a longitudinal axis of the handle portion is offset with respect to a longitudinal axis of the sensor portion, wherein dimensions and weights of the handle portion, the sensor portion, and the connecting portion are selected such that the sensor probe has a center of gravity located in the connecting portion.

2. The sensor probe according to claim 1, wherein the handle portion is at least partially made of a heat resistant plastic material.

3. The sensor probe according to claim 1, wherein an intermediate portion of the connecting portion comprises a slip-resistant surface at an upper and/or lower side.

4. The sensor probe according to claim 1, wherein the handle portion at a free end thereof facing away from the connecting portion comprises a gripping portion having an enlarged cross-section.

5. The sensor probe according to claim 1, wherein the elongate sensor portion has a pointed tip.

6. The sensor probe according to claim 1, wherein at least one of the sensor portion or the handle portion comprises one or more sensors selected from the group consisting of temperature sensors, humidity sensors, impedance sensors, density sensors, pressure sensors and combinations thereof.

7. The sensor probe according to claim 1, wherein the handle portion comprises a transmitter for wireless transmission of sensor data.

8. The sensor probe according to claim 1, wherein at least one of the sensor portion, the connecting portion or the handle portion comprises a heat resistant wire connection for transmission of sensor data.

9. The sensor probe of claim 1, wherein the connecting portion has a first end connected to the handle portion, a second end connected to the sensor portion, and a substantially flat intermediate portion connecting the first end and the second end.

10. The sensor probe of claim 9, wherein the connecting portion has an upper side facing towards the handle portion and a lower side facing towards the sensor portion, wherein the connecting portion at its first end comprises a protrusion that extends from the lower side of the connecting portion.

11. The sensor probe of claim 10, wherein the protrusion is provided with magnetic properties.

12. The sensor probe according to claim 1, wherein the sensor portion comprises an elongate element extending along a main axis of the sensor portion, wherein the stepped connecting portion extends at an angle to the main axis of the sensor portion.

13. The sensor probe of claim 12, wherein the stepped connecting portion and the main axis of the sensor portion are arranged at an angle of between 45° and 90°.

14. The sensor probe of claim 12, wherein the handle portion comprises an elongate element extending along a main axis of the handle portion that extends substantially parallel to the main axis of the sensor portion.

15. A sensor probe for measuring a food preparation parameter, comprising an elongate handle portion extending along a first axis, an elongate sensor portion extending along a second axis, and a connecting portion extending along a third axis; said connecting portion being located intermediate to and connecting the handle portion and the sensor portion such that said first axis is offset with respect to said second axis; said third axis being at an angle of from 45 degrees to 90 degrees relative to said second axis; a protrusion extending from a lower side of said connecting portion at an end thereof adjacent to where the connecting portion connects to said handle portion; said sensor probe having its center of gravity located in said connecting portion.

16. The sensor probe of claim 15, wherein said first axis is substantially parallel to said second axis, a weight of said sensor portion corresponding to a weight of said handle portion; said handle portion and said connecting portion being integrally formed of a heat resistant plastic material that is molded over said sensor portion; and said connecting portion being substantially flat and having an upper surface at an upper side thereof and a lower surface at the lower side thereof.

17. The sensor probe of claim 16, further comprising a slip-resistant coating on the upper surface and the lower surface of said connecting portion.

18. A cooking assembly comprising: a cooking vessel having a rim, a lid seated on said rim, and the sensor probe of claim 15; wherein a lower surface of said connecting portion at the lower side thereof rests on said rim between said protrusion and said sensor portion, and said lid rests on an upper surface of said connecting portion at an upper side thereof, thereby clamping said connecting portion in between said lid and said rim; and wherein said sensor portion extends within said cooking vessel while said handle portion extends outside said cooking vessel; said cooking vessel being closed by said lid with minimum interference by said sensor probe.

* * * * *